United States Patent
Chase

(10) Patent No.: US 7,040,793 B2
(45) Date of Patent: May 9, 2006

(54) CONTROLLED DEFORMABLE HEADLAMP ASSEMBLY

(75) Inventor: Lee A. Chase, East Grand Rapids, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 0 days.

(21) Appl. No.: 10/701,859

(22) Filed: Nov. 5, 2003

(65) Prior Publication Data

US 2004/0136195 A1    Jul. 15, 2004

Related U.S. Application Data

(60) Provisional application No. 60/423,817, filed on Nov. 5, 2002.

(51) Int. Cl.
*F21V 7/04*    (2006.01)

(52) U.S. Cl. ............... 362/549; 362/306; 362/369; 362/390; 362/450; 362/505

(58) Field of Classification Search ............ 362/549, 362/505, 507, 306, 369, 390, 450

See application file for complete search history.

(56) References Cited

U.S. PATENT DOCUMENTS

| | | | | |
|---|---|---|---|---|
| 4,475,148 A | * | 10/1984 | Tomforde | 362/549 |
| 6,190,030 B1 | | 2/2001 | Chase | |
| 6,331,068 B1 | * | 12/2001 | Chase | 362/549 |
| 6,502,974 B1 | * | 1/2003 | Chase et al. | 362/549 |
| 2001/0040811 A1 | | 11/2001 | Chase et al. | |
| 2001/0046140 A1 | | 11/2001 | Chase et al. | |

FOREIGN PATENT DOCUMENTS

EP    1048895    11/2000

\* cited by examiner

*Primary Examiner*—Stephen Husar
*Assistant Examiner*—Mark Tsidulko
(74) *Attorney, Agent, or Firm*—Price, Heneveld, Cooper, DeWitt & Litton, LLP

(57) ABSTRACT

An automobile lamp assembly that exhibits improved energy absorption characteristics as compared with known automobile lamp assemblies having a resiliently deformable flexure member positioned between a lens member and a housing member includes a flexure member that is configured to dynamically change its energy absorption characteristics during impact. More specifically, various geometries and/or materials are utilized to dynamically control deformation during impact and reduce damage and/or injury during an impact.

6 Claims, 4 Drawing Sheets

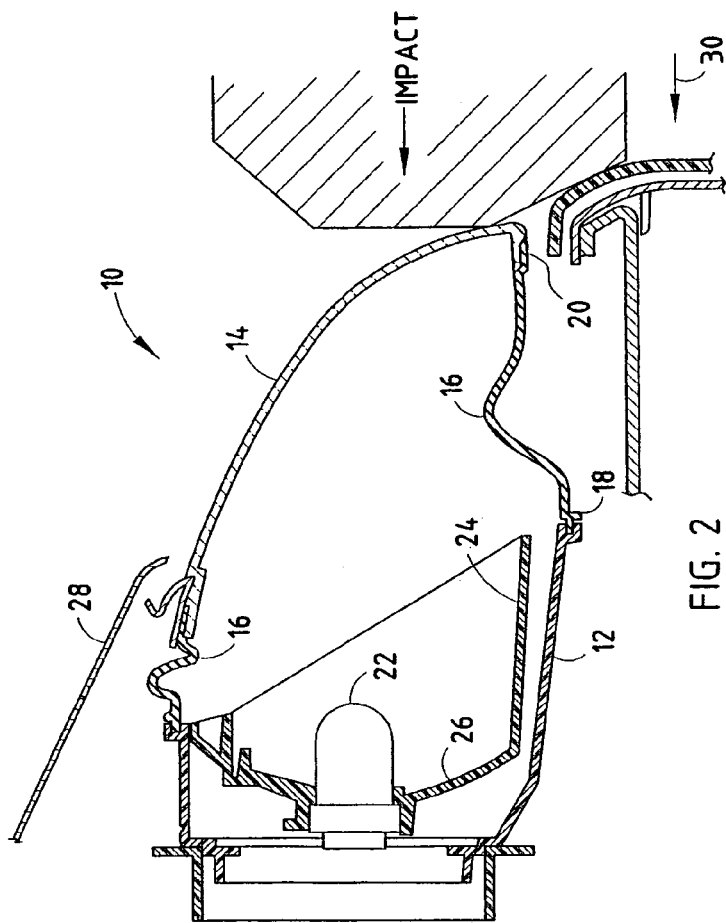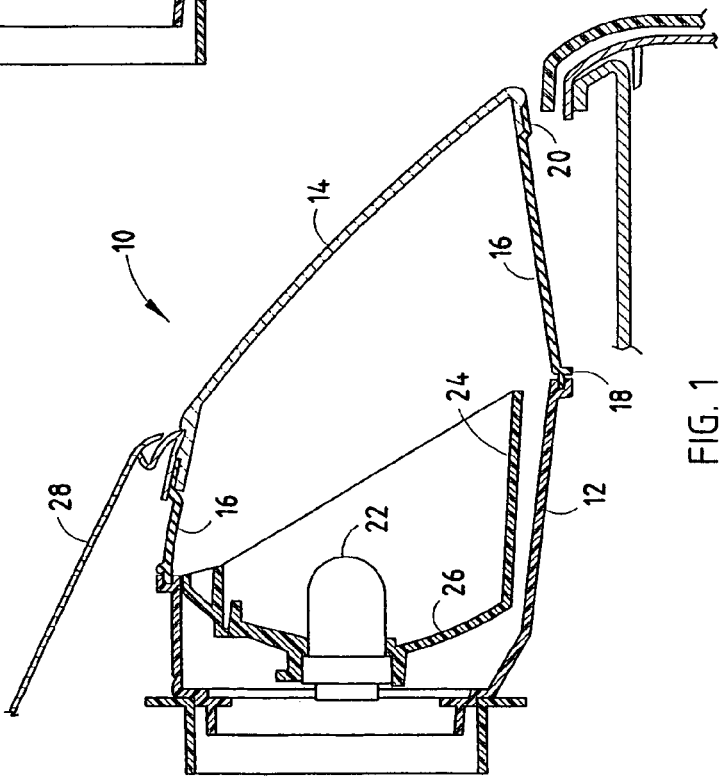

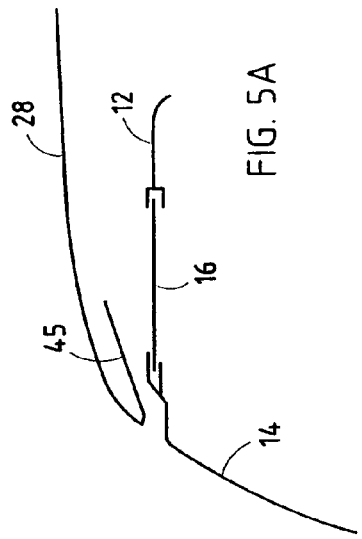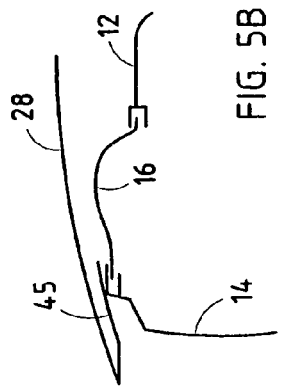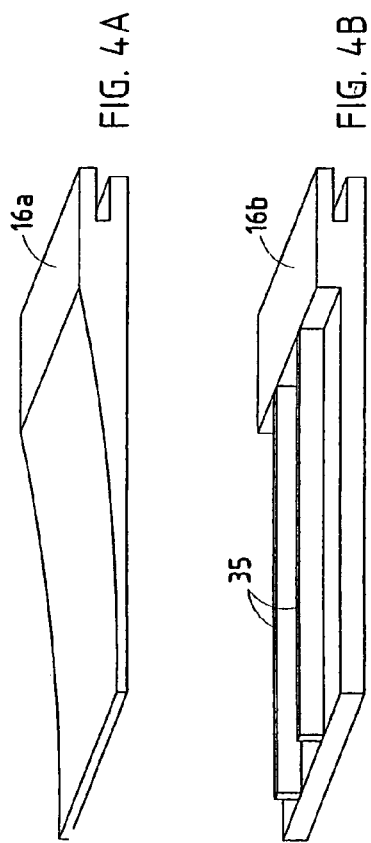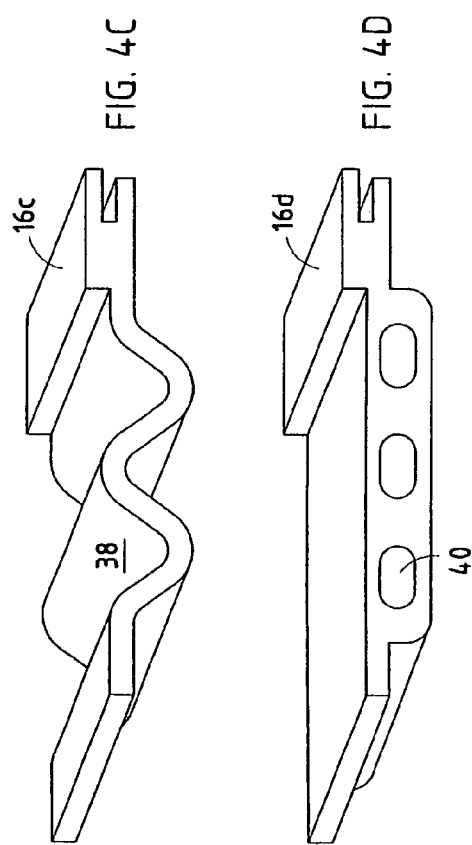

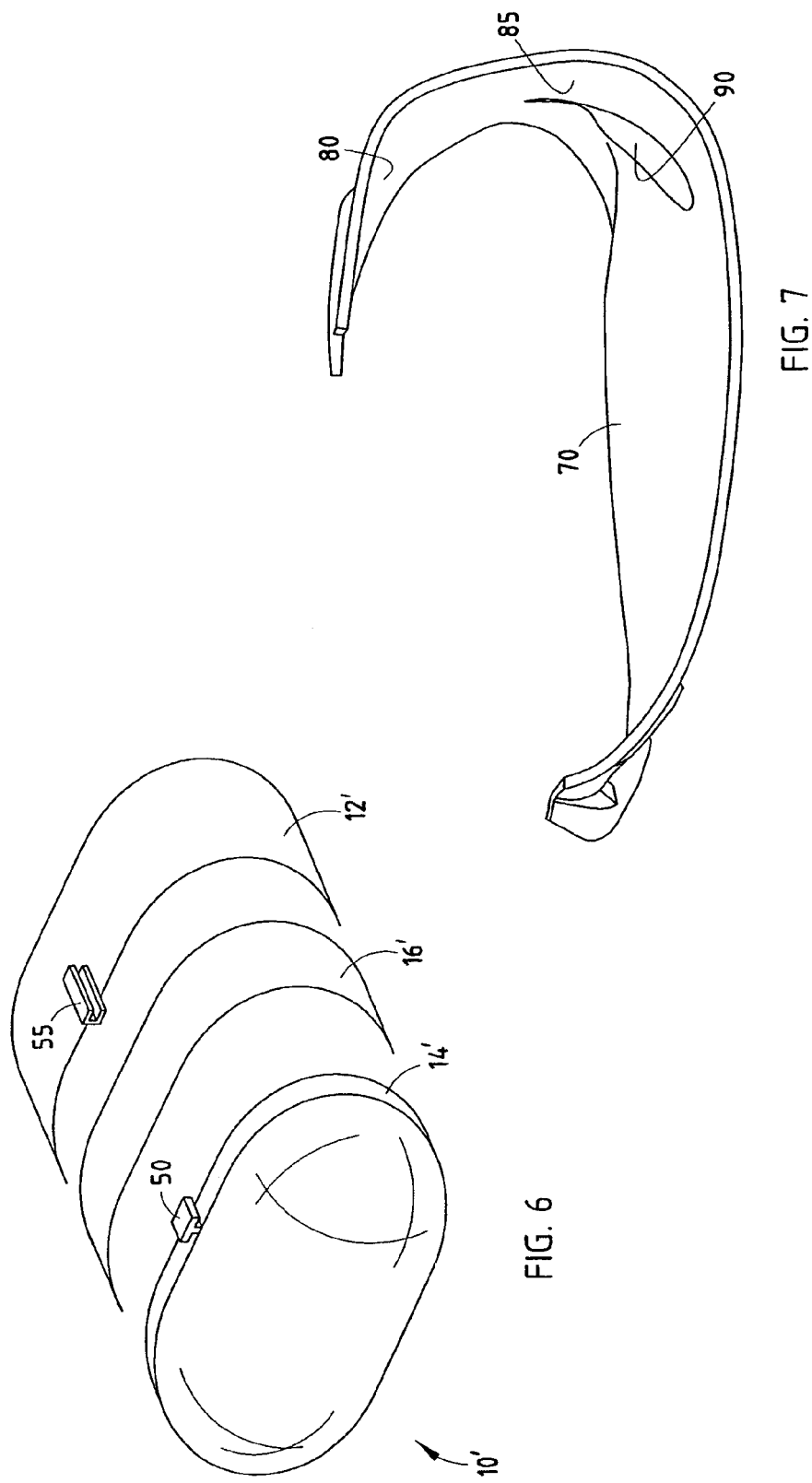

CONTROLLED DEFORMABLE HEADLAMP ASSEMBLY

CROSS-REFERENCE TO RELATED APPLICATION

This application claims priority under 35 U.S.C. § 119(e) on U.S. Provisional Application No. 60/423,817 entitled CONTROLLED DEFORMABLE HEADLAMP ASSEMBLY, filed Nov. 5, 2002, by Lee A. Chase, the entire disclosure of which is incorporated herein by reference.

BACKGROUND OF THE INVENTION

This invention relates to vehicle lamps and more particularly to vehicle lamp assemblies which are capable of elastic deformation upon impact with an object.

As vehicles become increasingly aerodynamically designed, there is a desire to provide headlamp and tail lamp assemblies which are integrated into the bodywork and bumpers of the vehicle to provide sleek, smooth, aerodynamic styling. When, however, the lamp assembly is substantially flush with either of the vehicle's bumpers, an impact with a foreign object by the a bumper could cause destruction of the lamp assembly and/or personal injury if a pedestrian is struck. Current headlamp assemblies typically employ a functional bulb reflector which, in turn, is surrounded by what is referred to as a "bright" bezel, which is a rigid high heat resistant material, such as nylon or polycarbonate vacuum metalized with aluminum to create a lamp assembly with an overall shiny or bright appearance when viewed through the lens. Such lamp assemblies will, however, be destroyed if placed flush with a vehicle bumper, when subjected to an impact force.

U.S. Pat. No. 6,190,030, the entire contents of which are incorporated by reference herein, discloses an improved automobile lamp assembly having a resiliently deformable flexure member secure to an optical lens member. The resiliently deformable flexure member is formed from a material having a predetermined elastic deformation that does not exceed a predetermined yield strength. The resiliently deformable flexure member provides resiliency to the optical lens member so that the lamp assembly may sustain a predetermined elastic deformation upon impact and return to a pre-impact position without damage.

U.S. Pat. No. 6,331,068, incorporated herein by reference in its entirety, U.S. patent application Publication No. US 2001/0046140, also incorporated herein by reference in its entirety, and U.S. patent application Publication No. US 2001/0040811, also incorporated herein by reference in its entirety, disclose various improvements to the automobile lamp assembly described in U.S. Pat. No. 6,190,030. The automobile lamp assemblies described in the above-referenced patents and published patent applications are effective at greatly reducing damage to the vehicle during an impact and reducing personal injury to a pedestrian during an impact. However, it has been discovered that the resiliently deformable flexure members of the automobile lamp assemblies discussed in the above-referenced patents and patent applications exhibit increased resistance against flexing in some areas during dynamic deformation. Accordingly, it is desirable to provide a modified automobile lamp assembly having a resiliently deformable flexure member that provides consistent predictable and uniform flexing during an impact.

SUMMARY OF THE INVENTION

The invention provides an automobile lamp assembly that exhibits improved energy absorption characteristics as compared with known automobile lamp assemblies having a resiliently deformable flexure member positioned between a lens member and a housing member. More specifically, the invention provides a resiliently deformable flexure member that can achieve consistent predictable and uniform flexing and dynamically controlled energy absorption characteristics during an impact. More specifically, the automobile lamp assemblies of this invention include a resiliently deformable flexure member having a geometry and/or composition that controls energy absorption during impact to achieve a desired energy absorption characteristics.

In one embodiment, the headlamp assembly includes a lens and housing having a flexure member positioned between the lens and the housing, wherein the flexure member is shaped to dynamically change its energy absorption characteristics during impact. In a more specific embodiment, the flexure member includes intersecting surfaces with preformed bulges at the intersections. In another embodiment, constraint means such as guides are provided on the housing to control the direction of deflection of the flexure member during an impact. In a specific embodiment, the lens includes a guide and the housing includes a guide track for engaging the guide and controlling the direction of movement of the lens during an impact.

In accordance with another aspect of the invention, the flexure member is made of dissimilar materials having different flex modulus and tensile modulus, whereby deformation of the flexure member is dynamically controlled during an impact.

These and other features, advantages and objects of the present invention will be further understood and appreciated by those skilled in the art by reference to the following specification, claims and appending drawings.

BRIEF DESCRIPTION OF THE DRAWINGS

FIG. 1 is a cross-sectional view of an automobile lamp assembly having a lamp housing, a lens, and a resiliently deformable flexural member disposed between the lens and the housing.

FIG. 2 is a cross-sectional view of the automobile lamp assembly of FIG. 1 during an impact with an object.

FIGS. 4A–4D illustrate perspective views of different geometries which may be employed for controlling the deformation of the flexure member shown in FIGS. 1 and 2.

FIGS. 5A and 5B are schematic cross-sectional views of a hood having a hood guide member 4 constraining movement of the lens of an automobile lamp assembly during impact.

FIG. 6 is an exploded perspective view of a headlamp assembly in which a guide mounted to the lens fits within a guide track within the headlamp housing for controlling the direction of deflection of the flexure member.

FIG. 7 is a diagram representing the deflection of a flexure member during impact and the effect that intersecting surfaces have on the formation of a column.

DESCRIPTION OF THE PREFERRED EMBODIMENTS

Figure 3:
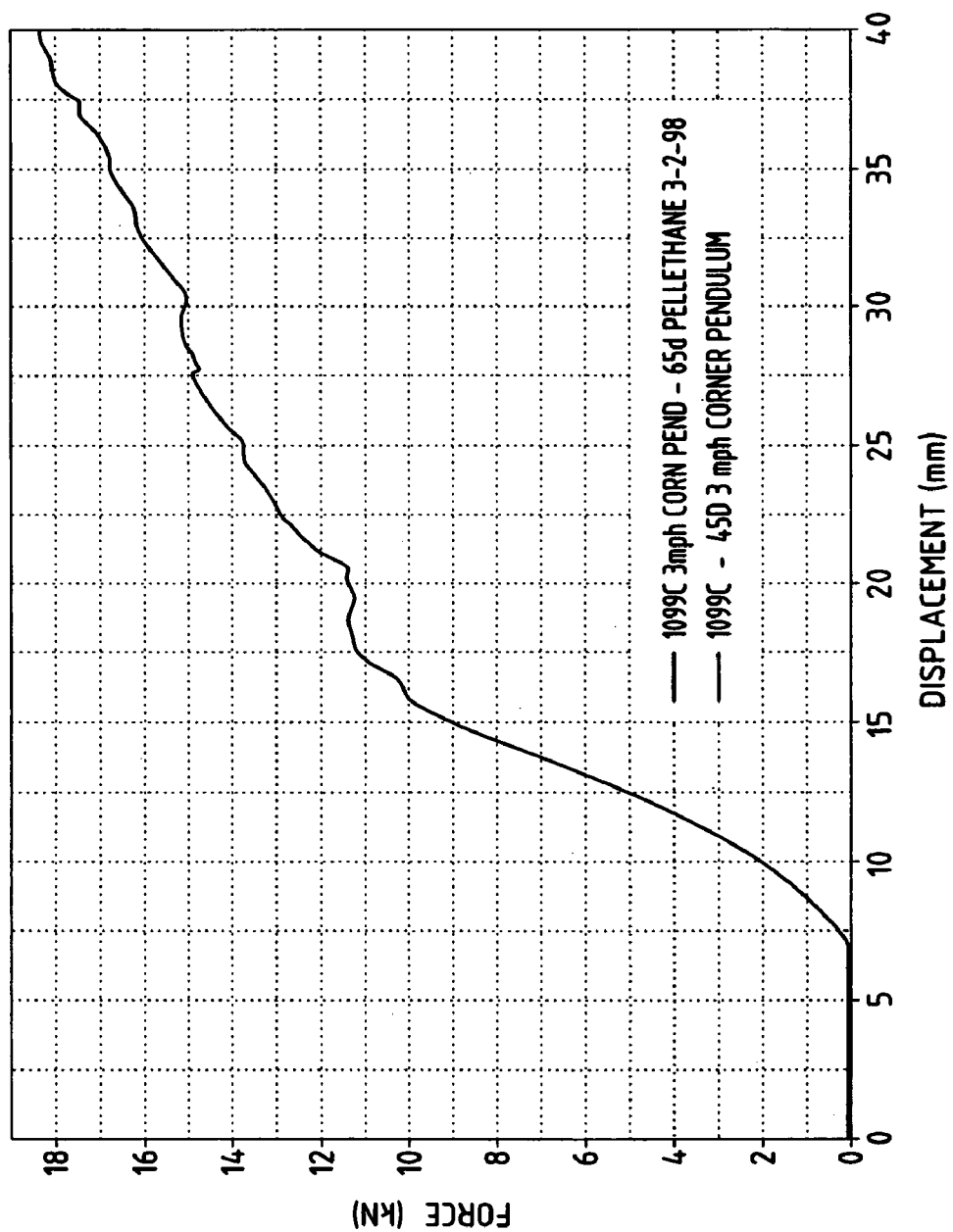
FIG. 3 is a force versus displacement curve for a typical flexure member.

Shown in FIG. 1 is a known headlamp assembly 10 having a housing member 12, a lens member 14 mounted in spaced relation to the housing member, and at least one resiliently deformable flexure member 16. The flexure member includes a first end 18 attached to housing 12 and another end 20 attached to lens member 14. An electric light source 22 is mounted in a typical reflector member 24 having a parabolic reflective inner surface 26 that directs light rays emanating from electric light source 22. Alternatively, a suitable direct filament lamp design may be utilized instead of the lamp assembly shown. Lens 14 is mounted forward of the impact zone, with an upper portion of the lens mounted adjacent to automobile hood 28 while a lower portion of the lens is directly located in the impact zone adjacent to bumper fascia 30. This arrangement provides a smooth transition from the front edge of the front bumper assembly rearward to hood 28 achieve low drag.

In order to allow lens 14 to move rearward without damage during impact, there is provided a resiliently deformable flexure member 16 between lens 14 and headlight housing 12. Flexure member 16 also acts as a seal between the lens and the headlight housing so that moisture, water, dust or other contaminants do not degrade the function of the headlamp system over its intended life cycle. Flexure member 16 can also be utilized to provide an aesthetic styling effect through the use of different colored materials or different external finishes to decorate the flexure member if desired.

FIG. 2 shows the automobile headlamp assembly of FIG. 1 during an impact. Resilient deformation of the headlight assembly is localized by the flexure member with no effects on the headlight housing and minimal effects on the lens. However, improved dynamic control of energy absorption of may be achieved utilizing the improved geometries and materials of this invention.

The design of flexure member is variable and highly dependent on the design of the headlamp assembly for a specific vehicle.

FIGS. 4A–4D show various geometries that may be used to control or influence energy absorption during an impact. These various geometries alter the force versus displacement curve during an impact and may be selected to achieve desired energy absorption characteristics that provide consistent predictable and uniform flexing. More specifically, dynamic control over the energy absorption during an impact may be achieved utilizing a resiliently deformable flexure member 16a having longitudinally variable thickness (changing thickness in the impact direction) as shown in FIG. 4A. As another alternative, dynamic control of energy absorption during an impact may be achieved by utilizing a resiliently deformable flexure member having a variable lateral thickness (i.e., a thickness that varies in a direction transverse to the direction of impact). For example, longitudinal upstanding ribs 35 that project from at least one side of flexure member 16b may be utilized as shown in FIG. 4B. Another geometry that may be utilized for dynamic control of the energy absorption during an impact is shown in FIG. 4C. In this embodiment, flexure member 16C has undulations 38, e.g., a sinusoidal longitudinal cross section. In another embodiment shown in FIG. 2D, a longitudinally variable total effective thickness is achieved by providing a flexure member 16d with hollow tubes 40 extending transversely (perpendicular to the direction of impact).

The resiliently deformable flexure member of the invention may be made using materials that have been conventionally used for flexure members. These materials include thermoplastic polyurethanes, rubber modified polypropylene, and thermoplastic elastomers (TPE). The lens is generally a more rigid material such as polycarbonate, and the housing is also a material that is more rigid than the flexure member, with suitable housing materials including polypropylene, polycarbonate, or thermoset polyvinyl esters.

Better dynamic control of the energy absorption characteristics of the automobile lamp assembly may also be achieved in accordance with this invention by utilizing structural constraints that guide the flexure member and/or lens during impact. These structural constraints that guide the flexure member and/or the lens during impact may be utilized alone or in combination with the above-referenced geometries (shown for example in FIGS. 2A–2D). For example, the automobile lamp assemblies of this invention may be employed in combination with a guide member 45 extending from the headlight body or adjacent components such as the hood (as shown in FIG. 5), grill, header, bumpers, etc. FIG. 5B illustrates how guide 45 is used as a structural constraint for guiding and controlling movement of lens member 14 and/or flexure member 16 during impact.

FIG. 6 shows an automobile lamp assembly 10' having a lens 14', a housing 12', and a flexure member 16' positioned between the lens and the housing, wherein the lens includes a guide 50 and the housing includes a guide rail 55. In the illustrated embodiment, guide 50 has a T-shaped configuration and engages a C-shaped guide rail 55. A second guide rail (not shown) may be utilized to engage both sides of the guide 50. Also, more than one guide and/or guide rail may be employed in the lamp assembly. Thus one or more guides and one or more guide rails may be employed to constrain displacement of the lens during impact so that damage of the lamp assembly is minimized.

In accordance with another embodiment of the invention, improved dynamic control of energy absorption characteristics may be achieved by utilizing a resiliently deformable flexure member comprising two or more materials that are segregated from each other in different regions of the flexure member but which are molded together at their interfaces to form a unitary flexure member. A flexure member of this type may be prepared using a multiple-shot molding procedure of dissimilar materials to form a unitary flexure member having longitudinally and/or transversely varying flex modulus and tensile modulus. The materials and their spatial arrangement in the flexure member may be selected to tune the deformation characteristics of the flexure member to achieve a desired dynamic control of the energy absorption characteristics in order to minimize damage and/or injury.

In FIG. 7 is a diagram representing the deflection of a lamp assembly during impact and the effect that intersecting surfaces have in forming a column. When a load is applied to the face of a lens of a lamp assembly, areas 70 and 80 of collapse and fold relatively easily. However, area 85 is a column that stiffens when areas 70 and 80 are folded relative to one another due to an impact. The result is the need for ever lighter loads to buckle area 85. To even the load, area 85 may be molded with a predefined bulge 90, i.e., a relatively thick area. This bulge or thick area in the lens controls the stiffness of the lens during flexing upon impact, and may be utilized in combination with the geometries and/or materials described above for the flexure member in order to achieve better dynamic control of the energy absorption characteristics and minimize damage during an impact.

The above description is considered that of the preferred embodiments only. Modifications of the invention will occur to those skilled in the art and to those who make or use the invention. Therefore, it is understood that the embodiment shown in the drawings and described above are merely for illustrative purposes and not intended to limit the scope of the invention, which is defined by the following claims as interpreted according to the principles of patent law, including the doctrine of equivalents.

The invention claimed is:

1. A headlamp assembly including a lens, a housing, and a flexure member positioned between the lens and the housing, wherein the flexure member has a plurality of ribs that extend in a longitudinal direction between the lens and the housing, and wherein the ribs have a constant cross-sectional shape and constant cross-sectional dimensions transverse to the longitudinal direction between the lens and the housing.

2. A headlamp assembly including a lens, a housing, and a flexure member positioned between the lens and the housing, the flexure member including intersecting surfaces and a preformed bulge at the intersection of the intersecting surfaces.

3. A headlamp assembly including a lens, a housing, and a flexure member positioned between the lens and the housing, the lens including a guide, and the housing including a guide track engaging the guide for controlling the direction of movement of the lens during an impact.

4. A headlamp assembly including a lens, a housing, and a flexure member positioned between the lens and the housing, the flexure member having undulations.

5. A headlamp assembly including a lens, a housing, and a flexure member positioned between the lens and the housing, the flexure member having a sinusoidal longitudinal cross section.

6. A headlamp assembly comprising a lens, a housing, and a flexure member extending between the lens and the housing, the lens and the housing having interactive elements guiding movement of the lens relative to the housing during an impact, whereby the direction of deflection of the flexure member during an impact is controlled.

* * * * *